(12) United States Patent
Friedman

(10) Patent No.: US 8,732,784 B2
(45) Date of Patent: May 20, 2014

(54) HIERARCHICAL STORAGE MANAGEMENT FOR DATA

(75) Inventor: Lee Friedman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 508 days.

(21) Appl. No.: 12/962,144

(22) Filed: Dec. 7, 2010

(65) Prior Publication Data
US 2012/0141092 A1 Jun. 7, 2012

(51) Int. Cl.
H04N 7/16 (2011.01)

(52) U.S. Cl.
USPC .............................. 725/141; 725/82; 386/248

(58) Field of Classification Search
USPC ................................................... 725/82, 141
See application file for complete search history.

(56) References Cited

U.S. PATENT DOCUMENTS

| | | | | |
|---|---|---|---|---|
| 6,831,676 B2 * | 12/2004 | Monroe | ...................... | 348/14.08 |
| 2005/0188407 A1 * | 8/2005 | van Beek et al. | ................ | 725/81 |
| 2006/0069687 A1 * | 3/2006 | Cui et al. | .......................... | 707/10 |
| 2006/0105749 A1 * | 5/2006 | Han et al. | .................... | 455/412.1 |
| 2007/0067808 A1 * | 3/2007 | DaCosta | .......................... | 725/62 |
| 2008/0066126 A1 | 3/2008 | Walter et al. | | |
| 2008/0307107 A1 | 12/2008 | Chen et al. | | |
| 2009/0019492 A1 * | 1/2009 | Grasset | ............................ | 725/45 |
| 2009/0150409 A1 * | 6/2009 | Watson et al. | ................... | 707/10 |
| 2010/0098153 A1 | 4/2010 | McCarthy et al. | | |
| 2010/0223407 A1 * | 9/2010 | Dong et al. | ...................... | 710/70 |

OTHER PUBLICATIONS

Adrian Covert, "Monsoon Volcano Is Like a Slingbox and Slingcatcher Rolled Up Into One," <http://gizmodo.com/5443319/monsoon-volcano-is-like-a-slingbox-and-slingcatcher-rolled-up-into-one>, published Jan. 8, 2010, printed Jun. 23, 2010, 2 pages.
"Play Your TV Anywhere—Video Streamer; Place-Shifter; Mobile TV," <http://www.monsoonmultimedia.com/>, 2007 Monsoon Multimedia, Inc., printed Jun. 23, 2010, 2 pages.
"Monsoon Announced Volcano 'God Box,'" <http://www.zatznotfunny.com/2010-01/monsoon-announces-volcano-god-box/>, printed Jun. 23, 2010, 5 pages.
U.S. Appl. No. 12/636,715, filed Dec. 12, 2009.
U.S. Appl. No. 12/638,366, filed Dec. 15, 2009.

* cited by examiner

Primary Examiner — Nnenna Ekpo
(74) Attorney, Agent, or Firm — Toler Law Group, PC

(57) ABSTRACT

A particular computing system includes a processor and a network interface to receive media content from one or more media recorder devices. The media content is transcoded into a portable media format. The computing system also includes a storage module executable by the processor to store the received media content to a data storage device. The computing system further includes a sideloading module executable by the processor to sideload stored media content from the data storage device to one or more first endpoint devices. The computing system also includes a streaming module executable by the processor to stream the stored media content from the data storage device to one or more second endpoint devices. The computing system further includes a backup module executable by the processor to transmit the stored media content from the data storage device to a second data storage device.

19 Claims, 6 Drawing Sheets

```xml
402 → <?xml version="1.0"?>
404 → <ASSETs>
408 →   <ROW>
412 →     <TITLE>Let_It_Be</TITLE>
414 →     <Type_Info>
416 →       <Format>mp3</Format>
418 →       <Duration>4:35</Duration>
420 →       <Size>2965462</Size>
          </Type_Info>
422 →     <FILENAME>Let-It_Be.mp3</FILENAME>
424 →     <ASSET_ID>Gracenote or UTC Tag</ASSET_ID>
426 →     <SHARING>
428 →       <State>Shared Resident</State>
430 →       <Closest>NASMASTER.lcl</Closest>
432 →       <Home>HOMEBASE.lcl</Home>
          </SHARING>
410 →   </ROW>
406 → </ASSETS>
```

*FIG. 4*

HIERARCHICAL STORAGE MANAGEMENT FOR DATA

FIELD OF THE DISCLOSURE

The present disclosure is generally related to media storage and use.

BACKGROUND

Advances in technology have enabled media to become more accessible. For example, media content sent from a content provider may be stored at a media recorder, such as a digital video recorder for later consumption. As digital video recorder technology has become more widespread, some consumers have amassed large libraries of stored media content. Maintaining, sharing, backing up, transporting, and version control of such large libraries of media content can become burdensome. For example, when a consumer has more than one media recorder device, the consumer may have difficult recalling which media content is recorded at each device.

BRIEF DESCRIPTION OF THE DRAWINGS

FIG. 4 is a depiction of an embodiment of a metadata record as an extensible markup language (XML) file;

DETAILED DESCRIPTION

Figure 1:
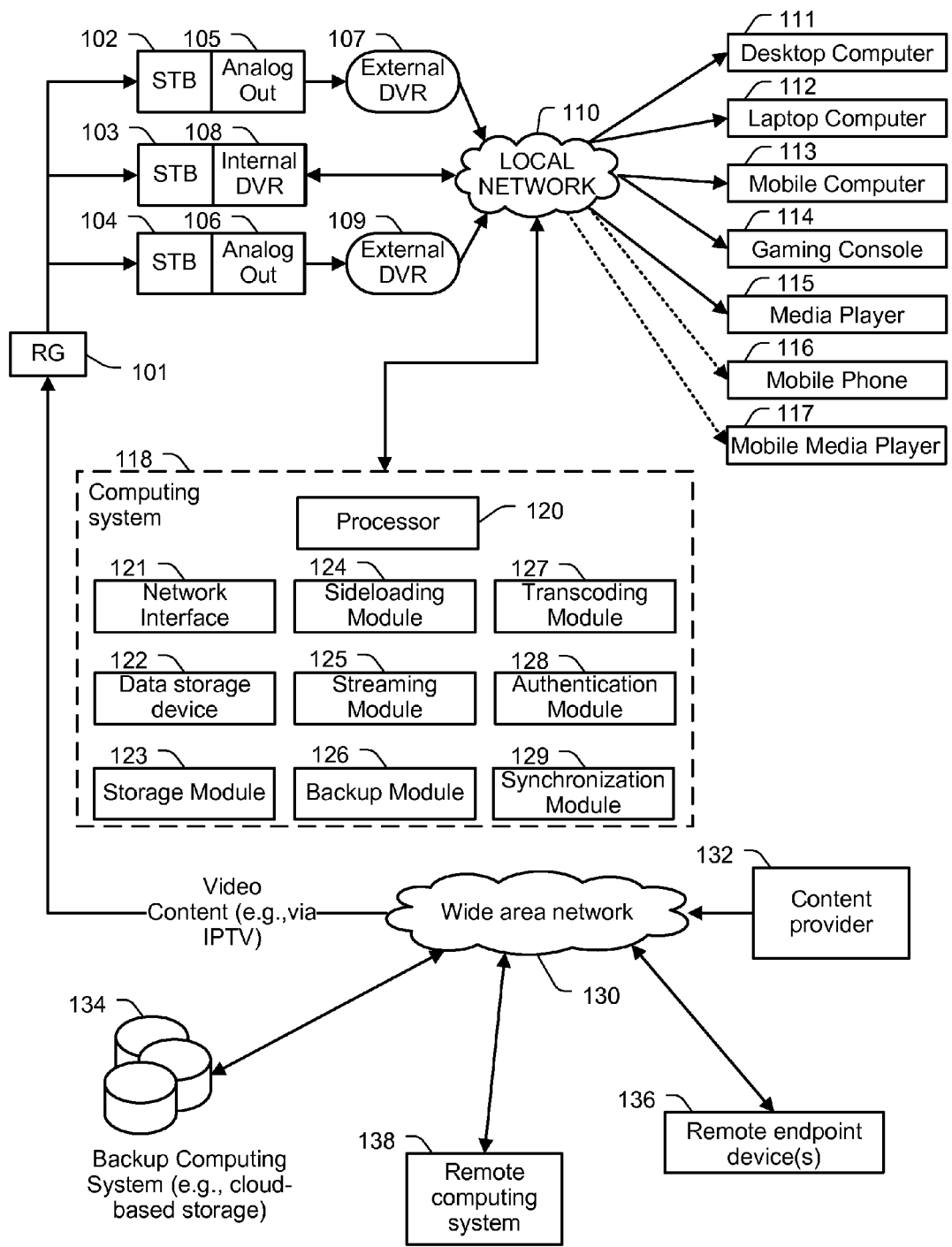
FIG. 1 is a block diagram of a particular embodiment of a computing system.

The present disclosure includes systems and method that enable users to manage large libraries of media content, such as video content, audio content, still images, other digital content (e.g., digital books), or a combination thereof Additionally, the systems and methods described enable use of the content at many different endpoint devices and in many different formats. In particular, a computing system is described that acts as a central storage location for media content stored in a local network (such as a home network of a user). The computing system may enable the user to more quickly find what media content is stored at the local network. The computing system may also facilitate using the media content at different endpoint devices with different capabilities, e.g., different file formats, etc. The computing system may also allow media content stored at the local network to be backed up (either at the local network or remotely) or shared with other users.

A particular embodiment includes a computing system having a processor and a network interface to receive media content from one or more media recorder devices. The received media content may be transcoded into a portable media format. The computing system also includes a storage module executable by the processor to store the received media content to a data storage device. The computing system further includes a sideloading module executable by the processor to sideload stored media content from the data storage device to one or more first endpoint devices. The computing system also includes a streaming module executable by the processor to stream the stored media content from the data storage device to one or more second endpoint devices. The computing system further includes a backup module executable by the processor to transmit the stored media content from the data storage device to a second data storage device.

While frequent reference is made to video content in this disclosure, it is understood that other types of media content may be present in addition to or instead of the video content. For example, in certain embodiments, any digital media content may be managed using the systems and methods disclosed herein. To illustrate, the digital media content may include video content, audio content, still images, other digital content (e.g., digital books), or a combination thereof In another particular embodiment, a method includes receiving a first video content item and associated metadata from a first digital video recorder (DVR) device at a content storage device via a local network. The method also includes receiving a second video content item and associated metadata from a second DVR device at the content storage device via the local network. The method further includes storing the first video content item and the second video content item at the content storage device. The method also includes streaming the first video content item from the content storage device to a first endpoint device located outside the local network. The method further includes streaming the second video content item from the content storage device to a second endpoint device located outside the local network. The first video content item and the second video content item are streamed concurrently.

In another particular embodiment, a non-transitory computer-readable storage medium includes instructions, that when executed by a processor, cause the processor to store video content received via a local network from one or more digital video recorder (DVR) devices to a data storage device. The instructions are further executable by the processor to sideload the stored video content from the data storage device to one or more first endpoint devices in response to at least one request. The instructions are further executable by the processor to stream the stored video content from the data storage device to one or more second endpoint devices in response to the at least one request. The instructions are also executable by the processor to transcode the stored video content from a first media format to a second media format based at least partially on the at least one request.

FIG. 1 is a block diagram of a particular embodiment of a system 100. The system 100 of FIG. 1 may enable media storage and use. The system 100 includes one or more set-top box devices, such as a first set-top box device 102, a second set-top box device 103, and a third set-top box device 104 coupled to a content provider 132. The set-top box devices 102-104 may be coupled to the content provider 132 via a residential gateway (RG) 101 and via a wide area network 130, such as the Internet, a cable television distribution network, an Internet Protocol Television (IPTV) distribution network, another private access network, a wide area wireless network, or any combination thereof The set-top box devices 102-104 may be coupled to or may include one or more digital video recorder (DVR) devices. For example, the second set-top box device 103 is illustrated in FIG. 1 as including an internal DVR 108. The first set-top box device 102 is illustrated in FIG. 1 as including an analog output 105, and the third set-top box device 104 is illustrated in FIG. 1 as including an analog output 106. Either, or both, of the analog outputs 105, 106 may be coupled to an external DVR device 107, 109.

The set-top box devices 102-104 and the DVR devices 107-109 may be coupled via a local network 110 to a computing system 118. In a particular embodiment, the local network 110 may include a local area network such as a wired network (e.g., an Ethernet network), a wireless local network (such as an 802.11, a Bluetooth, or other relatively short range wireless network), or combinations thereof. One or more endpoint devices may be in communication with the computing system 118 via the local network 110. For example, the endpoint devices may include a desktop computer 111, a laptop computer 112, a mobile computer 113, a gaming console 114, a media player 115, a mobile telephone 116, a mobile media player 117, or another endpoint device capable of playing media content. The computing system 118 may also communicate via the local network 110 and the wide area network 130 with one or more remote endpoint devices 136. The remote endpoint devices 136 may include devices similar to the endpoint devices 111-117. Additionally, the computing system 118 may communicate via the local network 110 and the wide area network 130 with one or more backup systems 134, such as a cloud-based storage system or a remote computing system similar to the computing system 118.

In a particular embodiment, the set-top box devices 102-104 may receive video content, such as television content, IPTV content, Video-On-Demand content, or other video content, from the content provider 132 via the wide area network 130. The set-top box devices 102-104 in cooperation with the DVR devices 107-109 may process the video content for output at the local network 110. For example, the set-top box devices 102-104 may be coupled to video display devices (not shown in FIG. 1), such as televisions, that are adapted to display the video content to a user. Additionally, the set-top box devices 102-104, the DVR devices 107-109, or both, may store the video content for later use or transcode the video content into a portable media format for use by another device, such as one of the endpoint devices 111-117.

The computing system 118 may be adapted to receive video content from the DVR devices 107-109 via the local network 110. The computing system 118 may also or in the alternative receive other digital media content from one or more other devices via the local network 110. In a particular embodiment, the DVR devices 107-109 may transcode the video content from a format in which the video content is transmitted by the content provider 132 to a portable media format. For example, the portable media format may be a format adapted for use at one or more of the endpoint devices 111-117 and 136. The computing system 118 may be adapted to store the content received from the DVR devices 107-109 and to provide access to the content to the endpoint devices 111-117 and 136. Thus, the computing system 118 may enable hierarchical storage and access to the media content. To illustrate, the DVR devices 107-109 may store a first set of video content, and the endpoint devices 111-117 may store a second set of video content. The computing system 118 may store an aggregated set of video content that includes the first set of video content and the second set of video content. The one or more backup systems 134 may store the aggregate set of video content and other video content (such as aggregate video content associated with one or more other users). Accordingly, the system of FIG. 1 enables hierarchical management and storage of data, such as the video content and/or other media content. The computing system 118 may also be adapted to store a backup copy of the media content at the backup computing system 134. The computing system 118 may also be adapted to modify or transcode the video content.

In a particular embodiment, the computing system 118 includes a processor 120. The processor 120 is adapted to execute one or more modules that provide functionality of the computing system 118. For example, the modules may be implemented in software stored on a non-transitory computer readable medium within the computing system 118. In another particular embodiment, all or a portion of the modules may be executed via hardware circuitry, such as application specific circuits. Additionally, the computing system 118 may include a data storage device 122. The data storage device 122 may be adapted to store computer executable instructions to implement the one or more modules. The data storage device 122 also may be adapted to store video content received from the DVR devices 107-109. In a particular embodiment, each video content item stored at the data storage device 122 is associated with a metadata record. The metadata record may include information descriptive of the video content item, such as a file name, a channel number via which the video content is received, a channel identifier associated with the channel number, a start time, a duration, an end time, a program name, an episode title, other descriptive information or any combination thereof The metadata record may be an extensible markup language (XML) file. FIG. 4 depicts an example of a metadata record as an XML file.

In a particular embodiment, the modules of the computing system 118 include a storage module 123, a sideloading module 124, a streaming module 125, a backup module 126, a transcoding module 127, an authentication module 128, and a synchronization module 129. The modules 123-129 are illustrated as separate components in FIG. 1 merely to facilitate description of functionality associated with each module 123-129. In certain embodiments, the modules 123-129 may be combined (for example into one or more software application or application specific circuits) or one or more of the modules 123-129 may be omitted.

The computing system 118 may include one or more network interfaces 121 adapted to facilitate communications between the computing system 118 and one or more other devices via the local network 110, the wide area network 130, or both. In a particular embodiment, a gateway device, such as a residential gateway (RG) 101 is coupled to the set-top box devices 102-104 and to the wide area network 130. The RG 101 may be adapted to communicate via the wide area network 130 using a public Internet Protocol (IP) address assigned to the RG 101 by an Internet provider or by another provider, such as a private access network provider or the content provider 132. The RG 101 may enable the set-top box devices 102-104 to share a single public IP address by assigning ports to devices on the local network 110. For example, the RG 101 may use a port translation table to assign individual port numbers to each of the set-top box devices 102-104 and to the computing system 118. The port numbers may be used to distinguish communications with each of the set-top box devices 102-104 and the computing system 118. Video content stored at the computing system 118 may be streamed to a first remote endpoint device of the remote endpoint devices 136 using the public IP address and a first port of the RG 101. Concurrently, or at a different time, video content stored at the computing system 118 may be streamed to a second remote endpoint device of the remote endpoint devices 136 using the public IP address and a second port of the RG 101. Accordingly, multiple endpoint devices 136 may receive video content from the computing system 118 via the same public IP address via different ports. The media content sent to the endpoint devices 136 may include the same video content or different video content.

In operation, the computing system 118 may receive video content from any of the one or more DVR devices 107-109 and may implement the storage module 123 to store the media content in a portable media format at the data storage device 122. After the video content is stored, or as the video content is being stored by the storage module 123, the computing system 118 may execute one or more of the other modules 124-129 to process the video content.

For example, the computing system 118 may execute the sideloading module 124 after video content is stored or as the video content is being stored. The sideloading module 124 may be adapted to sideload (e.g., download to a local device) video content to one or more of the endpoint devices 111-117. To illustrate, the sideloading module 124 may send a copy of the video content to a particular endpoint device 111-117 via the local network 110 or via a direct connection (e.g., a Universal Serial Bus (USB) connection, a IEEE 1394 ("Firewire") connection, a Bluetooth connection, an 802.11 connection, or another wired or wireless connection) between the particular endpoint device 111-117 and the computing system 118. In a particular embodiment, the sideloading module 124 or another module (not shown) may be executable to download the video content to the remote endpoint device 136 via the wide area network 130. To download the video content to the remote endpoint device 136, the video content may be packetized into data packets that can be transmitted and routed by the wide area network 130. For example, the video content may be packetized into Internet Protocol data packets. In contrast, to sideload the video content to a local endpoint device 111-117, the video content may be packetized into data packets for transmission via the local network (which may use IP packets or another communication protocol) or via a direct connection between the computing system 118 and the local endpoint device 111-117.

In a particular embodiment, the computing system 118 may implement the streaming module 125 to stream stored video content or video content that is currently being stored to one or more of the endpoint devices 111-117 via the local network 110 or to the one or more remote endpoint device 136 via the wide area network 130. In a particular embodiment, the streaming module 125 is executable to stream multiple content items to multiple endpoint devices 111-117 and 136 via multiple networks concurrently. To illustrate, the streaming module 125 may stream a first content item to one or more local endpoint devices 111-117 via the local network 110 and may concurrently stream the same media content item or another media content item to the one or more remote endpoint devices 136 located outside the local network 110 via the wide area network 130.

The computing system 118 may be adapted to implement the transcoding module 127 to modify a media format of video content into a different media format. For example, the transcoding module 127 may modify the media format of stored video content or may modify the media format of video content that is being received from one or more of the DVR devices 107-109. To illustrate, as described above, the video content may be received at the computing system 118 from the DVR devices 107-109 in a portable media format. The transcoding module 127 may transcode the video content from the portable media format to a second portable media format for transmission to and use at one or more of the endpoint devices 111-117 and 136.

Transcoding the video content into the second portable media format may include modifying a bit rate of the video content. For example, the video content may be received from the content provider 132 by the one or more DVR devices 107-109 at the first bit rate. The DVR devices 107-109 may transcode the video content into a second bit rate for transmission to the computing system 118. One or more of the endpoint devices 111-117 and 136 may be adapted to playback the video content at a third bit rate. Accordingly, the transcoding module 127 may modify the bit rate of the video content to the third bit rate. In another example, transcoding the video content may include modifying a resolution of the video content from a first resolution to a second resolution. To illustrate, the video content may be received from the content provider 132 by a particular DVR device of the DVR devices 102-104 at the first resolution and a particular one of the endpoint device 111-117 and 136 may be adapted to playback the video content at the second resolution. Thus, the particular DVR device may modify the resolution of the video content. In another example, transcoding the video content may include modifying a file format of the video content. To illustrate, the video content may be received from the content provider 132 by a particular DVR device of the DVR devices 102-104 in the first file format and a particular one of the endpoint device 111-117 and 136 may be adapted to playback the video content in the second file format. Thus, the particular DVR device may modify the file format of the video content. In yet another example, transcoding the video content may include modifying a compression scheme of the video content. To illustrate, the video content may be received from the content provider 132 by a particular DVR device of the DVR devices 102-104 in the first compression scheme and a particular one of the endpoint device 111-117 and 136 may be adapted to playback the video content using the second compression scheme. Thus, the particular DVR device may modify compression scheme of the video content.

To further illustrate, when a particular endpoint device, such as the gaming console 114 is not able to efficiently use the video content in the portable media format in which the DVR devices 107-109 send the video content to the computing system 118, the transcoding module 127 may transcode the video content into a second portable media format that the gaming console 114 can utilize. As a further illustration, certain portable media format may be less well suited for storage. For example, certain portable media formats may not be sufficiently compressed or may not include digital copyright controls (e.g., authentication or encryption). When the video content is in a media format that is less suitable for storage, the transcoding module 127 may transcode the video content into a media format that is better suited for storage.

The computing system 118 may implement the backup module 126 to generate or maintain backup copies of video content. For example, the backup module 126 may be executable to maintain a local backup of particular video content at the data storage device 122. For example, the data storage device 122 may include a redundant array of independent disc (RAID) storage system. The backup module 126 may stripe a backup copy of the particular video content across multiple discs of the RAID storage system. In another example, the backup module 126 may transmit data to the backup computing system 134 to maintain backup copies of the particular video content and of metadata associated with and descriptive of the video content. In another example, the backup module 126 may maintain a backup copy or a portion of a backup copy of video content stored at another computing system. To illustrate, two or more computing systems, such as the computing system 118 and a remote computing system 138, may cooperate via the wide area network 130 to maintain backup copies of video content for one another. In a particular embodiment, the backup module 126 may invoke the transcoding module 127 to transcode particular video content to be backed up. For example, the backup module 126 may cause the transcoding module 127 to transcode the particular video content to a media format that is more compressed for storage as a backup copy of the particular video content. In a particular embodiment, the backup module is also executable to recover video content. For example, video content that has been backed up to the backup computing system 134 from the computing system 118 and subsequently lost by the computing system 138 (e.g., due to equipment failure) can be recovered by the backup module 126 to the data storage device 122.

In a particular embodiment, the computing system 118 may execute the synchronization module 129 to synchronize data stored at the data storage device 122 with data stored at the remote computing system 138 or with data stored at one or more of the remote endpoint devices 136. For example, the computing system 118 and the remote computing system 138 may exchange data via the synchronization module 129 to identify video content items stored at the computing system 118 and video content items stored at the remote computing device 138. When a particular video content item is determined to be stored at one of the computing systems 118, 138 but is not stored at the other computing system 138, 118, the particular video content item may be copied to the other computing system to synchronize the video content stored at the computing system 118 and the remote computing system 138. In a particular embodiment, the computing system 118 and the remote computing system 138 are synchronized by exchanging only metadata descriptive of the video content stored at each computing system 118, 138. In this embodiment, the video content is only transmitted between the computing system 118 and the remote computing system 138 when a request to access the video content is received. To illustrate, when a user at the remote computing system 138 views a menu of available video content, the menu may include video content stored at the remote computing system 138 and video content stored at the computing system 118. When the user selects to view a particular video content item that is stored at the computing system 118, the remote computing system 138 may send a request to access the particular video content item to the computing system 118. In response to the request, the computing system 118 may send the particular video content item to the remote computing system 138.

In a particular embodiment, when a request to access particular video content is received at the computing system 118 from another device or user (e.g., from the backup computing system 134, the remote computing system 138, one or more of the remote endpoint devices 136, or one or more of the endpoint devices 111-117, the computing system 118 may implement or execute the authentication module 128 to determine whether the other device or user is authorized to access the particular video content. For example, before sending (e.g., sideloading, downloading or streaming) particular video content to a particular endpoint device of the one or more endpoint devices 111-117 and 136, the computing system 118 may determine whether the particular endpoint device is authorized to access the particular video content based on an identifier of the particular endpoint device, capabilities of the particular endpoint device (e.g., is the particular endpoint device compatible with digital rights management of the particular video content), an identifier of a user of the particular endpoint device (e.g., based on user credentials), digital rights management information associated with the particular video content, or any combination thereof. The authentication module 128 may receive authentication information from the one or more of the remote endpoint devices 136 or one or more of the endpoint devices 111-117 may permit or deny access to the stored video content based on the authentication information.

Figure 2:
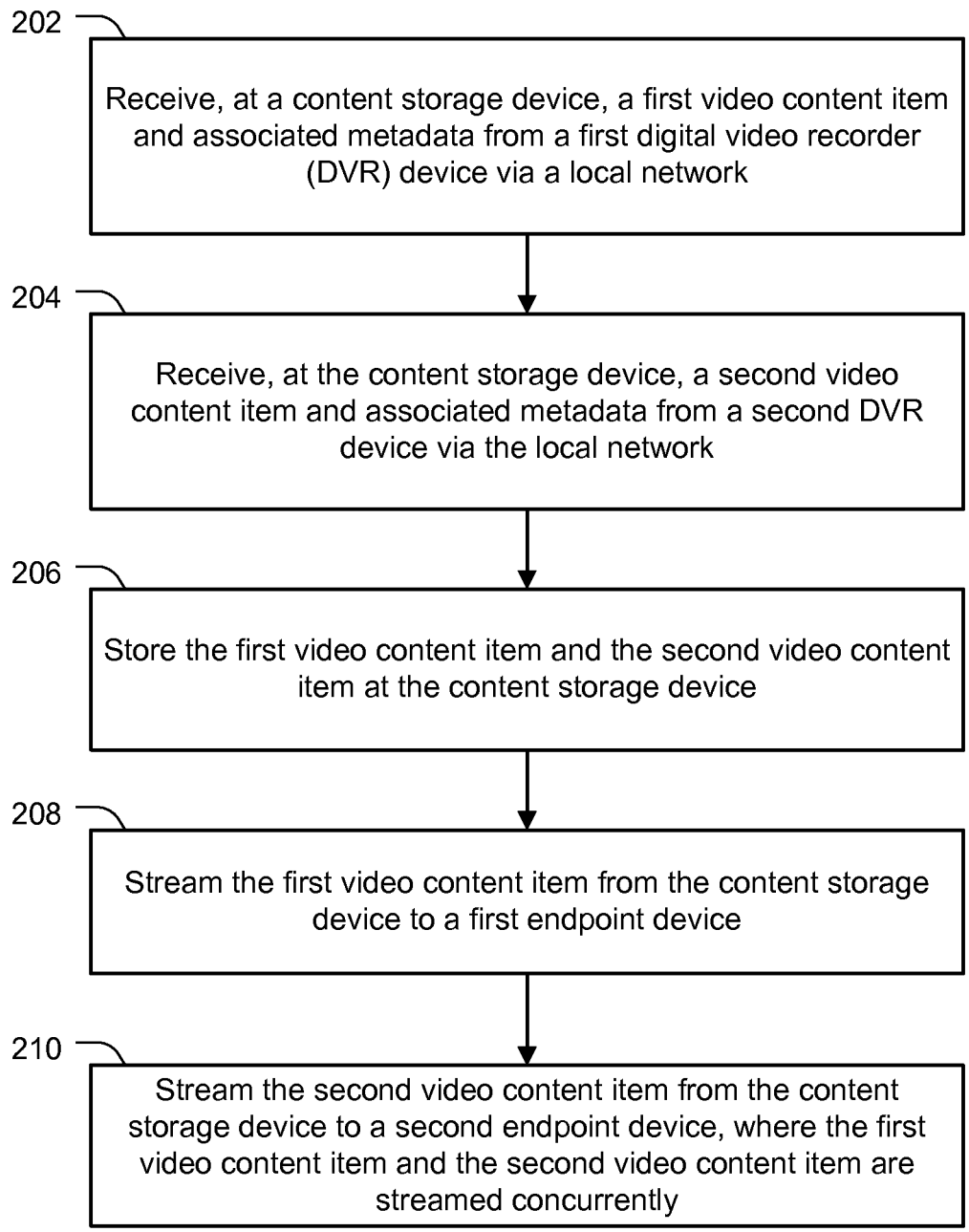
FIG. 2 is a diagram of a first particular embodiment of a method of storing and using media content.

FIG. 2 is a diagram of a first particular embodiment of method of storing and using media content. The method includes, at 202, receiving a first video content item and associated metadata at a content storage device from a first digital video recorder (DVR) device via a local network. For example, the local network may be coupled directly to the content storage device, such as via an Ethernet or other wired connection or a wireless local area network connection. In a particular embodiment, the content storage device is a computing system, such as the computing system 118 of FIG. 1.

The method also includes, at 204, receiving a second video content item and associated metadata from a second DVR device via the local network at the content storage device. For example, the first DVR device and the second DVR device may both be located within a particular facility, such as a user residence or business, and the content storage device may act as a central repository for media that has been received and processed by DVR devices at the particular facility. Thus, the method may further include, at 206, storing the first video content item and the second video content item at the content storage device.

The method may also include, at 208, streaming the first video content item from the content storage device to a first endpoint device located outside of the local network. For example, the first endpoint device may be one of the remote endpoint devices 136 of FIG. 1 that is coupled to a content storage device (e.g., the computing system 118) via the wide area network 130. The content storage device may communicate with the first endpoint device via the Internet, via a wireless mobile network, such as a cellular data network, or via another wide area network. The first endpoint device may include any user device that is adapted to use the first video content item. Additionally, the first video content item may be transcoded or otherwise modified by the content storage device before the first content item is streamed or communicated to the first endpoint device.

The method also includes, at 210, streaming the second video content item from the content storage device to a second endpoint device located outside the local network. For example, the second endpoint device may be one of the remote endpoint devices 136 of FIG. 1 coupled to a content storage device (e.g., the computing system 118) via the wide area network 130. In a particular embodiment, the first video content item and the second video content item are streamed concurrently. For example, the content storage device may be adapted to transcode or otherwise modify video content items and to stream or download the content items simultaneously or concurrently to multiple endpoint devices via a local network or a wide area network. Additionally, although FIG. 2 only illustrates two video content items being streamed, more than two or fewer then two video content items may be streamed, downloaded or sideloaded concurrently.

Figure 3:
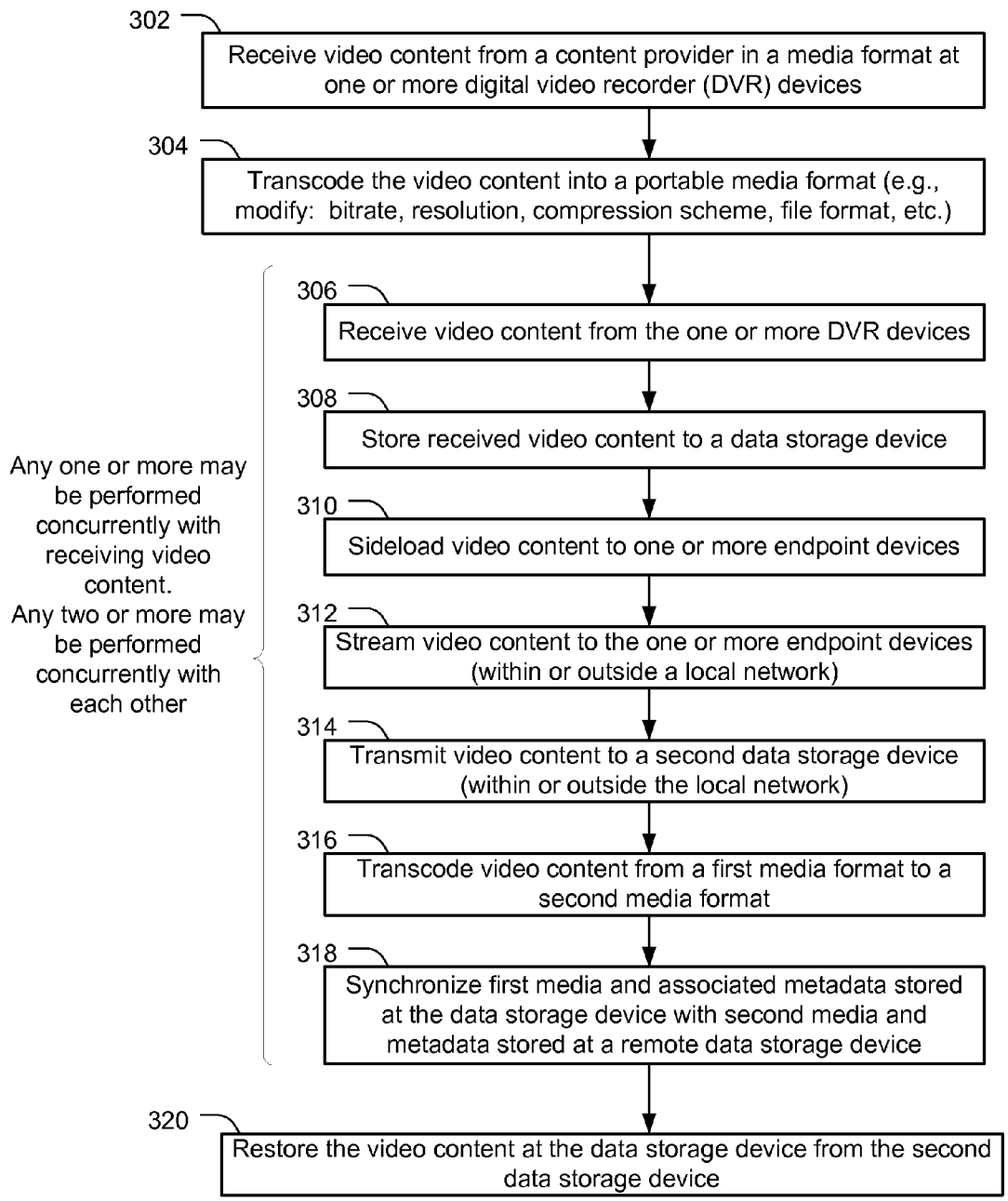
FIG. 3 is a diagram of a second particular embodiment of a method of storing and using media content.

FIG. 3 is a flow chart of a second particular embodiment of a method of media storage in use. The method includes, at 302, receiving video content from a content provider at one or more digital video recorder devices. The video content is sent from the content provider in a particular media format, such as MPEG-2. For example, the set-top box devices 102-104 of FIG. 1 may receive video content from the content provider 132.

The method also includes, at 304, transcoding the video content into a portable media format at the digital video recorder devices. For example, the digital video recorder devices may modify a bit rate of the media content, a resolution of the video content, a compression scheme of the video content, a file format of the video content, or other characteristics or parameters of the video content that enable the video content to be accessible via a portable media device. The digital video recorder devices may send the transcoded video content to a storage device via a local network. For example, the DVR devices 107-109 of FIG. 1 may send video content in a portable media format to the computing system 118.

The video content may be received from one or more digital video recorder devices at the storage device, at 306. The storage device may be adapted to perform various functions with respect to the video content. For example, the storage device may store the video content, transcode the video content, stream the video content, download or sideload the video content, backup the video content, synchronize the video content with video content stored at another storage device, or any combination thereof To illustrate, the method may further include, at 308, storing the received video content at the data storage device. The method may include, at 310, sideloading the video content to one or more endpoint devices from the data storage device. The method may include, at 312, streaming the video content to one or more endpoint devices, either outside or within a local area network from the data storage device. The method may include, at 314, transmitting video content to a second data storage device that is located either within the local area network or outside the local area network. In a particular embodiment, the method may include, at 316, transcoding the video content from a first media format to a second media format. For example, the video content may be received from the digital video recorder devices in the portable media format and may be transcoded by the data storage device into a second portable media format for use by one or more endpoint devices. In another example, the data storage device may transcode the video content to a storage format, e.g., a highly compressed format for storage or backup at a second media storage device.

The method may include, at 318, synchronizing the first media and associated metadata stored at the data storage device with second media and metadata stored at a remote storage device. For example, the first data storage device may be located at a first user's residence and a remote storage device may be located at a second user's residence. The data storage device in the remote data storage device may be configured to maintain synchronized lists of media. Thus, when the data storage device stores a new video content item, the remote data storage device may be synchronized with the data storage device to also store a copy of the new video content item. Likewise, when the remote data storage device receives and stores a new media content item, the data storage device may receive a copy of the new media content item for storage to maintain synchronization between metadata and media stored at the data storage device and the remote data storage device.

The data stored at the media storage device and the data stored at the remote storage device may be stored in a common (e.g., same) format or in a different format. For example, the data storage device may store media data in a first file format and may transcode the media data into a second file format for transmission to the remote data storage device to synchronize media stored at the two storage devices.

In another example of synchronizing media and associated metadata between the storage devices, the remote data storage device may include a backup storage device used to backup the media content stored at the data storage device. For example, the remote data storage device may include a network-attached storage at a content provider, such as an Internet Protocol Television (IPTV) content provider, that maintains a backup copy of media stored at the data storage device. In another example, the remote data storage device may include a cloud storage system adapted to distribute the media stored at the data storage device over a plurality of data storage servers coupled through a cloud network. Accordingly, a backup copy of media stored at the data storage device along with associated metadata may be maintained by the remote data storage device. The method may also include, at 320, restoring video content at the data storage device from the second data storage device in the event of loss of data or failure of the data storage device.

FIG. 4 is a depiction of an embodiment of a metadata record as an XML file 400. The XML file 400 may be stored in the data storage device 122 or one of the endpoint devices 111-117 and 136 of FIG. 1. The XML file 400 may include a beginning of file line 402. The XML file 400 may include a start asset list line 404 and a corresponding end asset list line 406 that specify an asset list. The asset list may identify assets that stored with a hierarchical storage system and accessible by a current device (i.e., a device on which the XML file 400 is stored). The XML file 400 may include a start asset line 408 and a corresponding end asset line 410 that specify a particular asset of the asset list. The XML file 400 may include a title line 412 that includes a title of the asset. The XML file 400 may include a type information section 414. The type information section 414 may include information describing the asset, such as a format 416, a duration 418, and a file size 420. The XML file 400 may include a filename line 422 that designates a filename of the asset. The XML file 400 may include an asset tag line 424. The asset tag line 424 may be used to cross reference the asset in an external media database or within the hierarchical storage system. The XML file 400 may also include a sharing section 426. The sharing section 426 may include information related to sharing of the asset within the hierarchical storage system. For example, the sharing section 426 may include a state line 428 that designates a shared state of the asset relative to the current device (i.e., the device on which the XML file 400 is stored). The sharing section 426 may also include a closest line 430 that designates a closest shared location of the asset within the hierarchical storage system. The sharing section 426 may include a root line 432 that designates a root storage location of the asset within the hierarchy.

Figure 5:
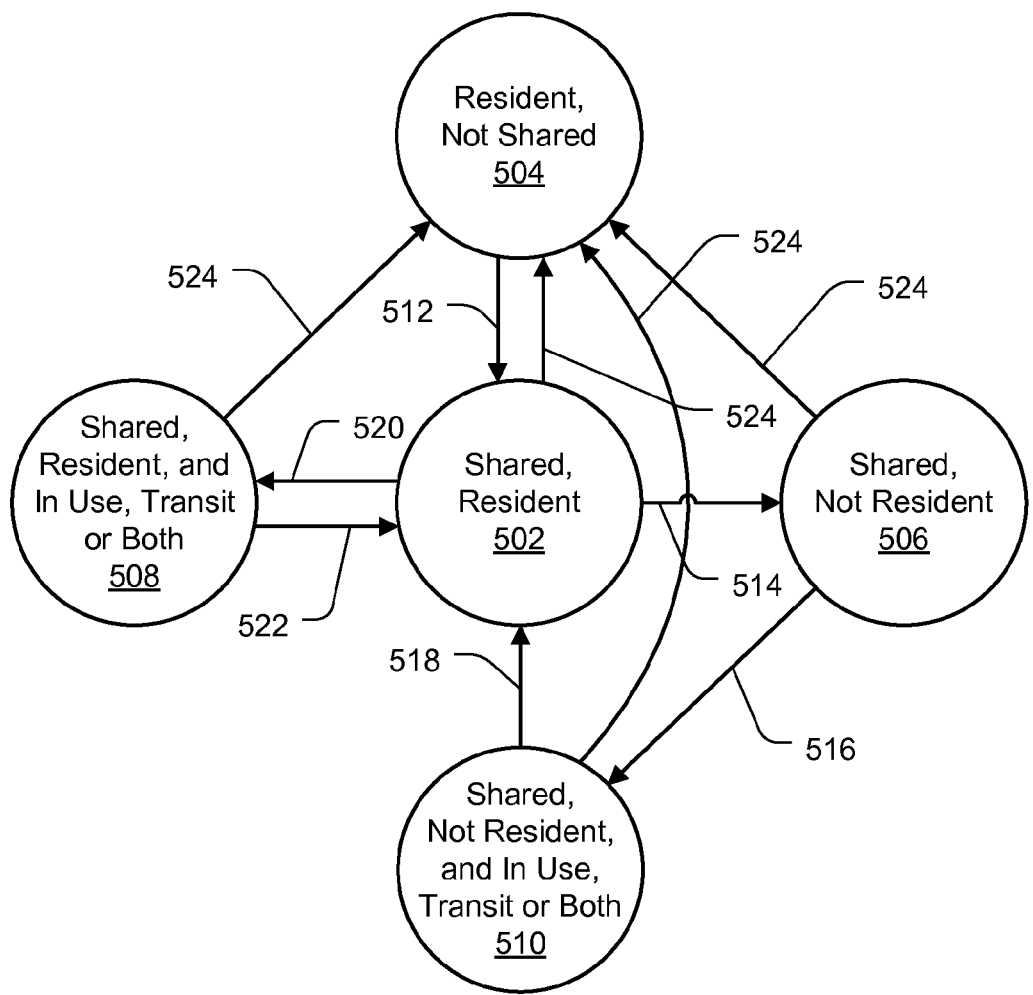
FIG. 5 is a diagrammatic representation of an embodiment of asset states in a hierarchy.

FIG. 5 depicts a diagrammatic representation of an embodiment of asset states in a hierarchical storage system, such as the system 100 of FIG. 1. Each storage device of the hierarchical storage system may store an asset database (e.g., an XML file) that includes information regarding assets within the hierarchical storage system. The asset database may indicate an asset state of each asset. The asset database may be separate from the assets. For example, the asset database at a particular device may indicate that a particular asset is stored in hierarchical storage system, even though the particular asset is not stored at the particular device.

The asset states illustrated in FIG. 5 are relative to a storage device on which the asset database is stored. For example, the asset database for the computer system 118 of FIG. 1 may be stored in the data storage device 122. The asset database may be populated from information obtained from metadata records, such as the metadata record 400 depicted in FIG. 4. The asset states in the asset database are relative to the computer system 118.

The asset states shown in FIG. 5 include a shared, resident asset state 502; a not shared, resident asset state 504; a shared, not resident asset state 506; a shared, resident, and in use, transit or both asset state 508; and a shared, not resident, and in user, transit or both asset state 510. The asset states 502-510 for a particular asset may be changed as indicated by the arrows 512-524 in FIG. 5.

The not shared, resident asset state 504 may be changed to the shared, resident asset state 502 via an arrow 512. For example, a user may designate which devices (e.g., one or more of the endpoint devices 111-117 and 136 of FIG. 1) are to have access to the particular asset that is stored in the hierarchical storage system.

The shared, resident asset state 502 may be changed to the shared, not resident asset state 506 via an arrow 514. For example, the asset may be removed from the current storage device (though the asset remains stored by the hierarchical storage system). The database may include an indication of which particular storage device or particular storage devices store the asset. In a particular embodiment, a root device associated with a particular asset may not transition to the shared, not resident asset state 506 because the root device stores a primary or reference copy of the asset for the hierarchical storage system.

The shared, not resident asset state 506 may be changed to the shared, not resident, and in use, transit or both asset state 510 via an arrow 516. For example, the shared, not resident, and in use, transit or both asset state 510 may be indicated when the particular asset is in use by the current storage device, being transferred to another storage device, or both.

The shared, not resident, and in use, transit or both asset state 510 may be changed to the shared, resident asset state 502 via an arrow 518. For example, after the asset has been transferred to the current storage device, the state of the asset may transition to the shared, resident asset state 502.

The shared, resident asset state 502 may be changed to the shared, resident, and in use, transit or both asset state 508 via an arrow 520. The shared, resident, and in use, transit or both asset state 510 may be indicated when the particular asset is in use, when the particular asset is being transferred to another storage device, or both.

The shared, resident, and in use, transit or both asset state 508 may be changed to the shared, resident asset state 502 via an arrow 522. The change indicated by the arrow 522 may occur when the particular asset ceases to be in use, or a transfer of the asset is completed or terminated.

The state of the asset may change from one of the asset states 502, 506, 508 and 510 to the not shared, resident asset state 504 via arrows 524. For example, when an owner of the asset decided to no longer share the asset, the owner may mark the asset not shared. In a particular embodiment, the asset and corresponding database entries may be removed from other storage devices other than the current storage device. In embodiments where the root device stores each of the assets, the particular asset and corresponding database entries may be removed from other storage devices other than the storage device and the root device.

In a particular embodiment, the data storage device may be adapted to perform several functions with respect to the video content concurrently. For example, the storage device may concurrently store video content, may transcode video content, may stream video content, may download or sideload video content, may backup video content, may synchronize video content with video content stored at another storage device, or any combination thereof Additionally, a particular function may be performed concurrently with respect to a single content item or multiple different content items. To illustrate, concurrently with receiving a particular content item, the particular content item may be written to a data storage device, transcoded to one or more different data formats, sent (e.g., sideloaded, downloaded, streamed, or any combination thereof) to one or more endpoint devices, or any combination thereof In another illustrative example, a first content item may be received, stored, transcoded, or sent while a second content item is being received, stored, transcoded, sent, or any combination thereof In still another illustrative example, a first content item that was previously recorded or stored may be streamed, sideloaded or downloaded while a second content item (e.g., live video content) is being received, stored, transcoded, sent, or any combination thereof.

Figure 6:
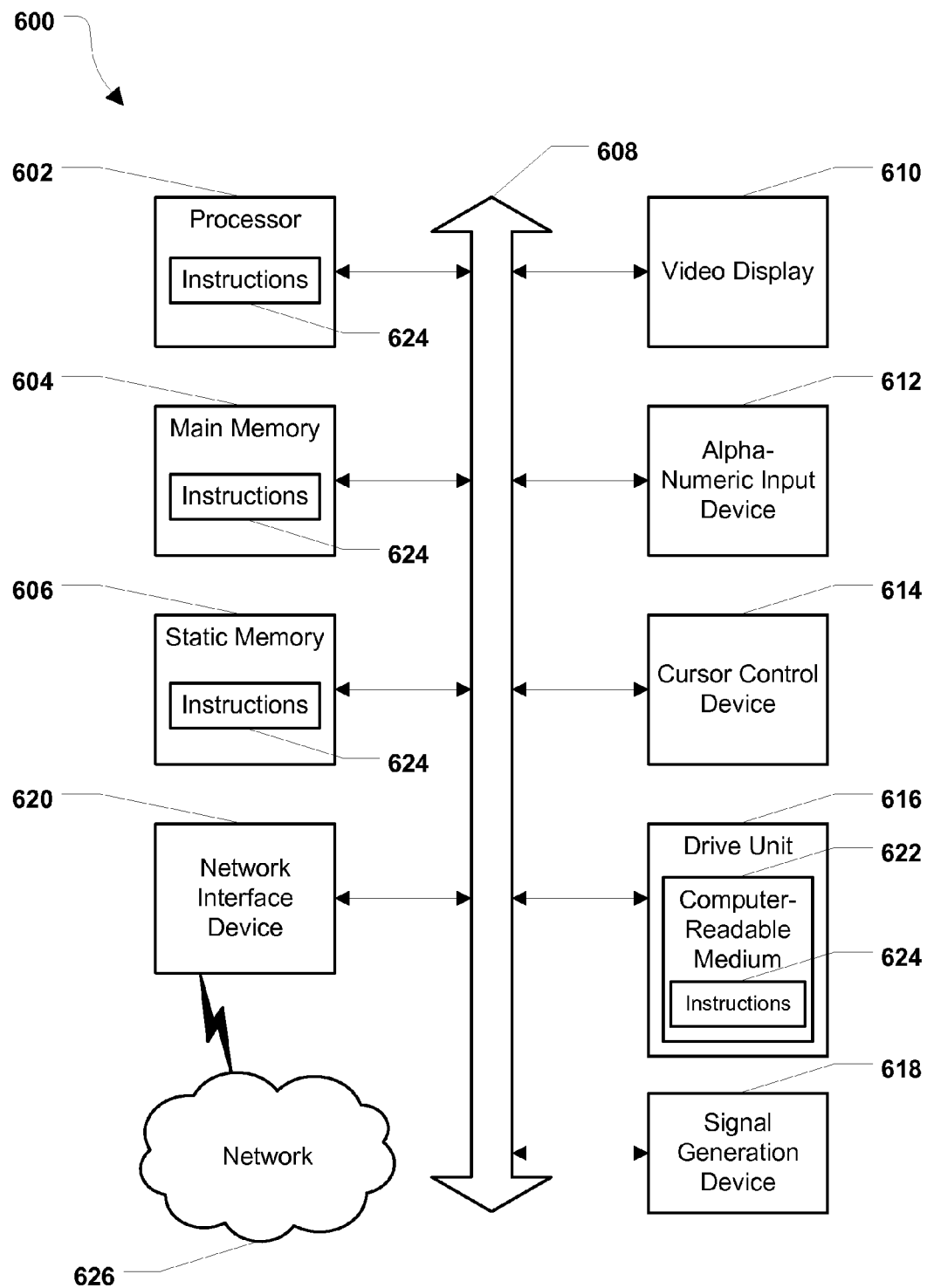
FIG. 6 is a block diagram of a general computer system adapted for particular embodiments.

Referring to FIG. 6, an illustrative embodiment of a general computer system is shown and is designated 600. For example, the computer system 600 may include or be included within any one or more of the set-top box devices 102-104, DVR devices 107-109, computing system 118, residential gateway 101, endpoint devices 111-117 and 136, remote computing system 138, and backup computing system 134 of FIG. 1. The computer system 600 includes a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices. The computer system 600 can also be implemented as or incorporated into various devices, such as a personal computer (PC), a tablet PC, a personal digital assistant (PDA), a mobile device, a smart phone, a palmtop computer, a laptop computer, a desktop computer, a communications device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include or be coupled to a video display unit 610, such as a liquid crystal display (LCD), an organic light emitting diode (OLED), a flat panel display, a solid-state display, a television display or a projection display. Additionally, the computer system 600 may include an input device 612, such as a keyboard, a remote control device, and a cursor control device 614, such as a mouse. The computer system 600 can also include a disk drive unit 616, a signal generation device 618, such as a speaker or remote control device, and a network interface device 620. The network interface device 620 may be coupled to other devices (not shown) via a network 626.

In a particular embodiment, as depicted in FIG. 6, the disk drive unit 616 may include a computer-readable non-transitory medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable non-transitory media. The non-transitory computer-readable medium may also be adapted to store video content, e.g., as video content files, and associated metadata records.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 600. Further, in a particular embodiment, implementations can include distributed processing and parallel processing. Alternatively, virtual computer system processing can be constructed to implement one or more of the methods or functionality as described herein.

The present disclosure describes a computer-readable non-transitory medium that includes instructions 624 so that a device connected to a network 626 can communicate voice, video or data over the network 626. Further, the instructions 624 may be transmitted or received over the network 626 via the network interface device 620. For example, the network 626 may be the wide area network 130 of FIG. 1 or the local network 110 of FIG. 1.

While the computer-readable non-transitory medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing a set of instructions for execution by a processor or that cause a computer system to perform any one or more of the methods or operations disclosed herein.

In a particular embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored. Software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards and protocols for computer communications (e.g. TCP/IP, 802.11, IEEE 1394, etc.) and media content standards (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A computing system, comprising:
    a processor;
    a transcoding module executable by the processor to:
        transcode video content from a first media format into a second media format suitable for storage; and
        transcode the video content from the second media format into a third media format suitable for playback on an endpoint device;
    a storage module executable by the processor to:
    store the video content to a first data storage device;
    store user input at the first data storage device, the user input indicating that the endpoint device has access to the video content, wherein the video content is stored at a second data storage device distinct from the first data storage device;
    receive second user input at the first data storage device, the second user input designating the video content as unshared; and
    initiate removal of the video content from each storage device, other than a root storage device, of a hierarchical storage system at which the video content has been replicated;
    a network interface to retrieve, in response to a request from the endpoint device, the video content in the first media format from the second data storage device;
    a sideloading module executed by the processor to sideload the video content from the first data storage device to the endpoint device;

a streaming module executable by the processor to stream the video content from the first data storage device to the endpoint device; and a backup module executable by the processor to transmit the video content from the first data storage device to a third data storage device.

2. The computing system of claim 1, wherein the second data storage device transcodes the video content into the first media format before transmitting the video content to the computing system.

3. The computing system of claim 1, wherein transcoding the video content comprises modifying a bit rate of the video content from a first bit rate to a second bit rate, modifying a resolution of the video content from a first resolution to a second resolution, modifying a compression scheme of the video content, or any combination thereof.

4. The computing system of claim 1, wherein transcoding the video content comprises modifying a file format of the video content from a first file format to a second file format.

5. The computing system of claim 1, wherein the endpoint device comprises a desktop computing device, a laptop computing device, a mobile computing device, a mobile phone, a portable media player device, a gaming console, or any combination thereof, and wherein the computing system enables hierarchical storage of the video content.

6. The computing system of claim 1, wherein the computing system is coupled to a local network via the network interface, wherein the streaming module is further executable by the processor to concurrently stream the video content from the first data storage device to a first remote endpoint device located outside the local network and to a second remote endpoint device located outside the local network.

7. The computing system of claim 6, wherein a network device coupled to the local network is assigned a particular public internet protocol address, and wherein the video content is streamed to the first remote endpoint device via a first port of the particular public internet protocol address that is assigned to the network device and the video content is streamed to the second remote endpoint device via a second port of the particular public internet protocol address that is assigned to the network device.

8. The computing system of claim 1, wherein the computing system is coupled to a local network via the network interface, wherein the streaming module is further executable by the processor to concurrently stream the video content from the first data storage device to a local endpoint device located within the local network and to a remote endpoint device located outside the local network.

9. The computing system of claim 1, wherein the computing system is adapted to concurrently sideload the video content from the data storage device to the endpoint device and stream the video content from the data storage device to a second endpoint device.

10. The computing system of claim 1, further comprising an authentication module executable by the processor to:
receive authentication information from the endpoint device; and
permit access to the video content based on the authentication information and based on the user input.

11. The computing system of claim 1, wherein each video content item stored at the first data storage device and the second data storage device is associated with a metadata record.

12. The computing system of claim 11, wherein the metadata record comprises an extensible markup language file.

13. The computing system of claim 1, further comprising a synchronization module executable by the processor to synchronize media and corresponding metadata stored at the first data storage device with media and corresponding metadata stored at a remote data storage device.

14. The computing system of claim 1, wherein the backup module is further executable by the processor to restore the video content at the data storage device from the second data storage device.

15. A method comprising:
storing user input at a first data storage device, the user input indicating that an endpoint device has access to video content, wherein the video content is stored at a second data storage device distinct from the first data storage device;
receiving a request from the endpoint device for the video content;
in response to the request from the endpoint, retrieving the video content from the second data storage device and simultaneously performing at least two of:
storing the video content to the first data storage device;
sideloading the video content from the first data storage device to a second endpoint device;
streaming the video content from the first data storage device to the endpoint device; and
transcoding the video the video content from a first media format to a second media format associated with the endpoint device;
receiving second user input at the first data storage device, the second user input designating the video content as unshared; and
initiating removal of the video content from each storage device, other than a root storage device, of a hierarchical storage system at which the video content has been replicated.

16. The method of claim 15, wherein the video content comprises previously recorded video content.

17. A computer-readable storage device storing instructions that, when executed by a processor, cause the processor to perform operations including:
storing user input at a first data storage device, the user input indicating that an endpoint device is to have access to video content, wherein the video content is stored at a second data storage device distinct from the first data storage device;
receiving a request from the endpoint device for the video content;
in response to the request from the endpoint device, retrieving the video content via a local network from the second data storage device and simultaneously performing two of:
storing the video content to the first data storage device;
sideloading the video content from the data storage device to the endpoint device;
streaming the video content from the first data storage device to a second endpoint device; and
transcoding the video from a first media format to a second media format associated with the endpoint device;
receiving second user input at the first data storage device, the second user input designating the video content as unshared; and
initiating removal of the video content from each storage device, other than a root storage device, of a hierarchical storage system at which the video content has been replicated.

18. The computer-readable storage device of claim 17, wherein the second endpoint device is outside the local network and wherein the video content is transcoded and streamed to the second endpoint device via a wide area network concurrently with the video content being received from the second data storage device.

19. The computing system of claim 1, wherein the video content is not stored at the first data storage device while the user input is stored at the first data storage device.

* * * * *